(12) United States Patent
Prins

(10) Patent No.: US 11,168,450 B2
(45) Date of Patent: Nov. 9, 2021

(54) SYSTEM TO PREVENT AND MITIGATE STORM SURGE DAMAGE, SEA-LEVEL RISE DAMAGE, RIVERINE FLOODING DAMAGE COMPRISING MODIFIED CONCRETE CULVERTS, PEDESTRIAN ACCESS AND NATURAL COASTAL, RIVER, CREEK, AND WETLAND ECOSYSTEMS

(71) Applicant: Edmond Leonard Prins, Jupiter, FL (US)

(72) Inventor: Edmond Leonard Prins, Jupiter, FL (US)

(*) Notice: Subject to any disclaimer, the term of this patent is extended or adjusted under 35 U.S.C. 154(b) by 0 days.

(21) Appl. No.: 17/123,261

(22) Filed: Dec. 16, 2020

(65) Prior Publication Data

US 2021/0148068 A1    May 20, 2021

(51) Int. Cl.
    *E01F 5/00*     (2006.01)
    *E02B 11/00*    (2006.01)
    *E02B 3/10*     (2006.01)

(52) U.S. Cl.
    CPC .............. *E01F 5/005* (2013.01); *E02B 3/10* (2013.01); *E02B 11/005* (2013.01)

(58) Field of Classification Search
    CPC ............. E02B 3/10; E02B 11/005; E01F 5/00
    See application file for complete search history.

(56) References Cited

U.S. PATENT DOCUMENTS

| | | | | |
|---|---|---|---|---|
| 4,314,775 A * | 2/1982 | Johnson | ................ | F16L 1/036 138/105 |
| 4,983,070 A * | 1/1991 | Hwang | ................ | E01F 5/005 405/124 |
| 5,647,689 A * | 7/1997 | Gunter | ................ | E01C 13/00 404/2 |
| 7,762,205 B1 * | 7/2010 | Veazey | ................ | A01K 61/59 114/267 |
| 9,732,508 B1 * | 8/2017 | Kent | ................ | B65G 5/00 |
| 2004/0076473 A1 * | 4/2004 | Burkhart | ................ | E03F 1/005 405/36 |
| 2010/0226721 A1 * | 9/2010 | May | ................ | E02B 13/00 405/126 |
| 2011/0255922 A1 * | 10/2011 | Elliott | ................ | E01F 5/005 405/126 |
| 2012/0117739 A1 * | 5/2012 | Cook | ................ | E02B 3/127 14/73 |
| 2016/0116112 A1 * | 4/2016 | Bradfield | ................ | E03F 1/005 52/578 |
| 2020/0130229 A1 * | 4/2020 | Kloet | ................ | B28B 7/241 |

\* cited by examiner

*Primary Examiner* — Benjamin F Fiorello
(74) *Attorney, Agent, or Firm* — Venable LLP; Michele V. Frank

(57) ABSTRACT

Protection of upland areas adjacent to a variety of water body shorelines from flooding events by combining modified drainage culverts with and hidden by natural ecosystem flood attenuation environments.

15 Claims, 4 Drawing Sheets

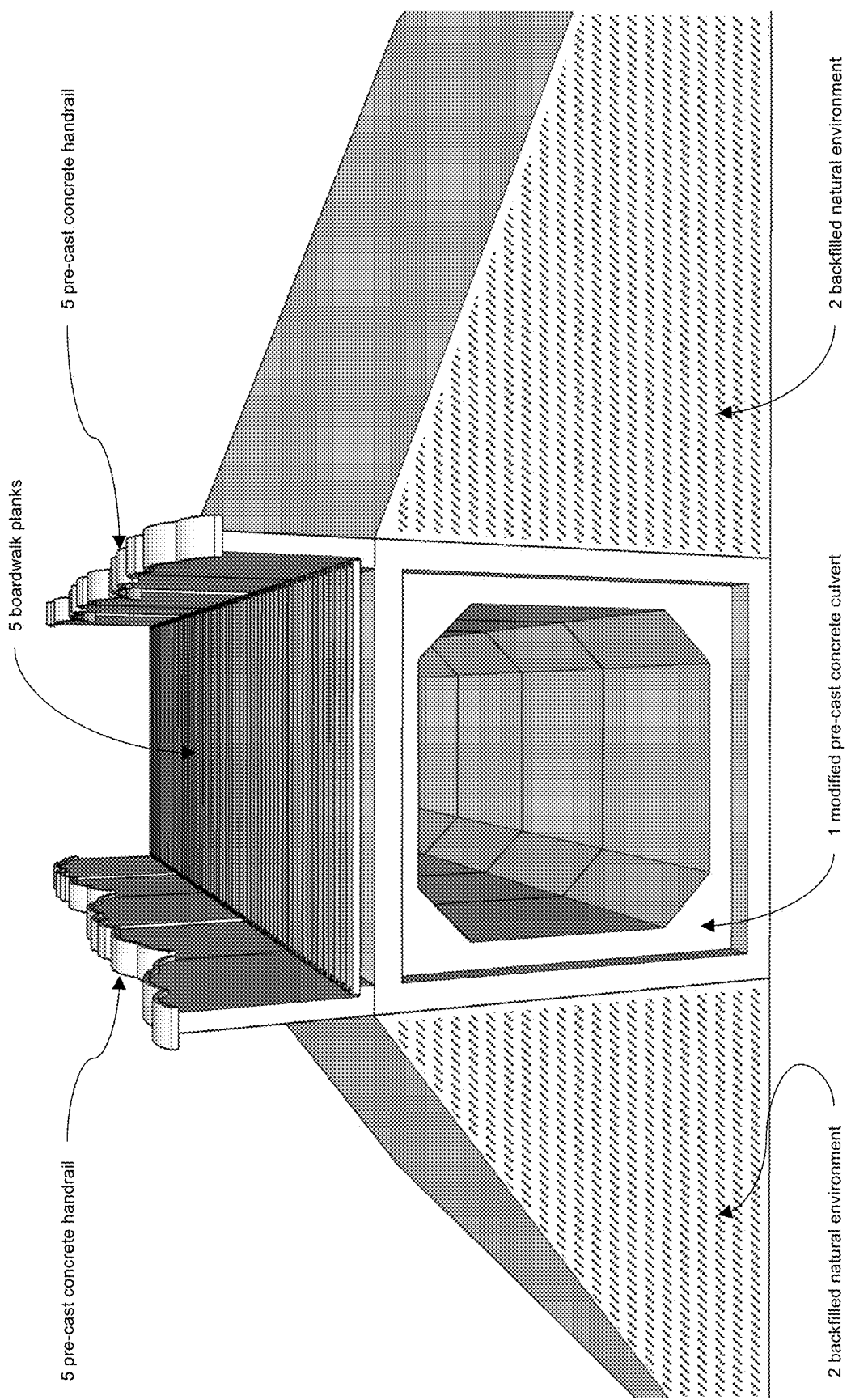

SYSTEM TO PREVENT AND MITIGATE STORM SURGE DAMAGE, SEA-LEVEL RISE DAMAGE, RIVERINE FLOODING DAMAGE COMPRISING MODIFIED CONCRETE CULVERTS, PEDESTRIAN ACCESS AND NATURAL COASTAL, RIVER, CREEK, AND WETLAND ECOSYSTEMS

BACKGROUND

1. Technical Field

The present disclosure relates to the effects of climate change on upland and built environments, and more specifically to mitigating and stopping flooding events that are impacting areas near ocean coastlines, river and creek banks, marsh and other wetland environments by combining artificial drainage with the protective effects of natural environments.

2. Introduction

Climate change is affecting weather patterns creating more frequent and more intense storms and contributing to acceleration of glaciers melting; Sea level rise and other flooding events are knock-on consequences of climate change. Governments, communities and businesses are confronting major financial and social impacts from these events.

Said system will comprise a modified pre-cast concrete culvert drainage system, pedestrian and light vehicle boardwalk, coastal access incorporating natural coastal, riverine and wetland defenses to protect vulnerable locations from flooding. Should storm surge, sea level rise, king tides or other flooding events over-top the natural dune or other natural environments as appropriate, floodwater and precipitation will be directed between the boardwalk planks and into said modified pre-cast concrete culvert below through gravity and will flow to either a detention pond, designated overflow floodable areas or back out to sea, river or wetland as specified in the specific application.

SUMMARY

Disclosed is a system, configured to assist governments, communities, corporations and individuals to prevent and mitigate flooding events from water and wetland bodies bordering upland areas.

There are no inventions to date that combine natural coastal, riverine, marshland ecosystems with enhanced drainage systems to protect flooding vulnerable areas. Presently, upland areas vulnerable to flooding events either have no protection or continue to utilize unsightly and not always effective or environmentally-friendly methods and systems to protect flood prone areas like concrete sea walls, steel sheet piled sea walls, levies and elevating existing infrastructure above recorded flood events.

Said system builds upon the natural defenses of many coastal, riverine and wetland environments by providing the additional defense of a modified pre-cast concrete culvert system that will mitigate or prevent floodwaters from reaching and damaging inhabited residential structures, exposed businesses, infrastructure and industries. Additionally, by incorporating natural ecosystems as protective enhancements, said system will not visually or environmentally degrade the ecosystems it is installed in, as previously mentioned systems mentioned herein do, and will also enhance and provide public access to coastal, riverbank and wetland areas as permitted.

Additional features and advantages of the disclosure will be set forth in the description which follows, and in part will be obvious from the description, or can be learned by practice of the herein disclosed principles. These and other features of the disclosure will become more fully apparent from the following description or can be learned by the practice of the principles set forth herein.

BRIEF DESCRIPTION OF THE DRAWINGS

FIG. 4 illustrates exemplary perspective close-up view of a plurality of assembled components.

DETAILED DESCRIPTION OF THE INVENTION

Various embodiments of the disclosure are described in detail below. While specific implementations are described, it should be understood that this is done for illustration purposes only. Other components and configurations may be used without parting from the spirit and scope of the disclosure.

The present disclosure addresses a method of preventing and/or mitigating the effects of flooding events on upland areas. Previous inventions and/or methods of flood damage protection have not incorporated natural coastal, riverine, marsh/swamp ecosystems to enhance the protection of upland areas, provide pedestrian and light vehicle access to the shore areas and to hide the man-made portions of the exemplary invention disclosed herein.

Figure 2:
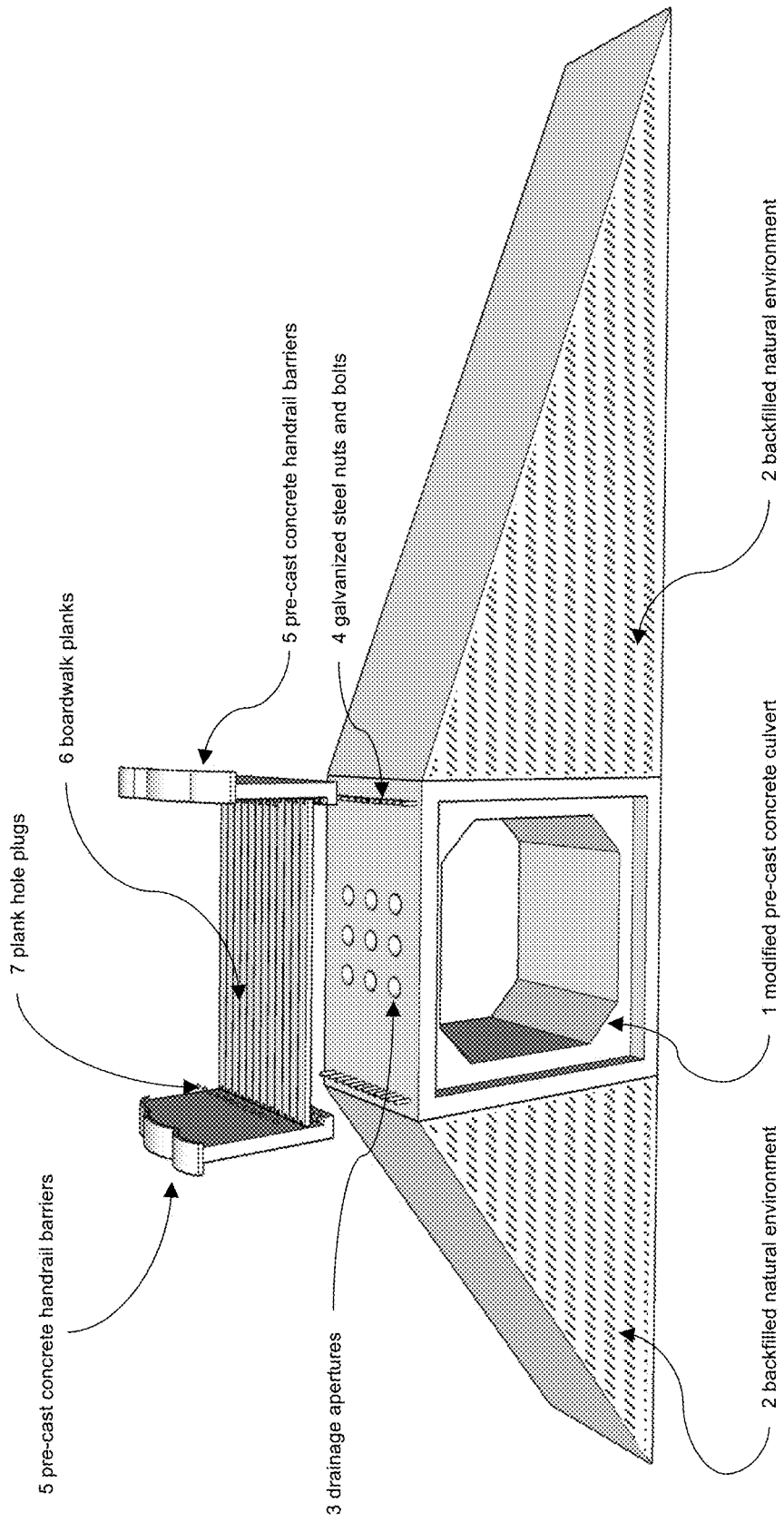
FIG. 2 illustrates exemplary cross section of the assembled components in an exploded view.
Figure 3:
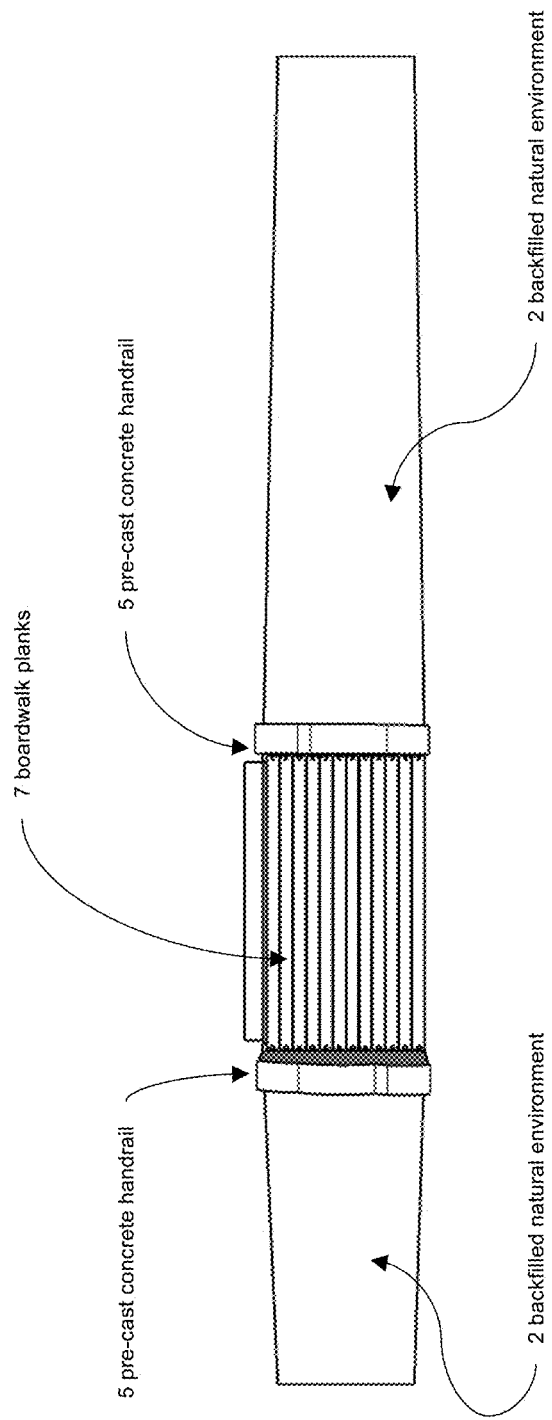
FIG. 3 illustrates exemplary plan view of the assembled components.

FIG. 4 illustrates a perspective view of the exemplary embodiment of the invention comprising a plurality of modified pre-cast concrete culverts (1). In FIG. 2, a cross section of said modified pre-cast concrete culvert is presented. Said modified pre-cast concrete culvert (1) is constructed at the point of manufacture with drainage apertures in its top face (3), to allow any precipitation and or flooding waters to enter and be drained to a predetermined designated flood water detention area or returned to the flooding body of water. In this embodiment of the present disclosure, the top face of said modified precast concrete culvert (1) will also have galvanized steel bolts (4), embedded at the point of manufacture to receive and secure a plurality of pre-cast concrete handrail barriers (5), and in this embodiment of the invention, recycled plastic boardwalk planks (6).

Said plurality of modified pre-cast concrete culverts (1), said precast concrete handrail barriers (5), said recycled plastic boardwalk planks (6), will be transported from the point of manufacture to the designated area to be protected.

Said plurality of modified precast concrete culverts (1) will be lifted into the designated area to be protected. Said pre-cast concrete handrail barriers (5) will be aligned with said galvanized steel bolts (4) and lowered onto said modified precast concrete culverts (1). Said recycled plastic boardwalk planks (6) will be aligned with said galvanized steel bolts (4) and placed onto said pre-cast concrete handrail barriers (5). Once attached to said modified pre-cast concrete culvert (1), said recycled plastic boardwalk planks (6) and said pre-cast concrete handrail barriers (5) shall be secured by means of a plurality of said galvanized steel nuts (4) placed and tightened on a plurality of said galvanized steel bolts (4). In this embodiment of said invention, the holes in said recycled plastic boardwalk planks will be covered by recycled plastic plugs (7).

Figure 1:
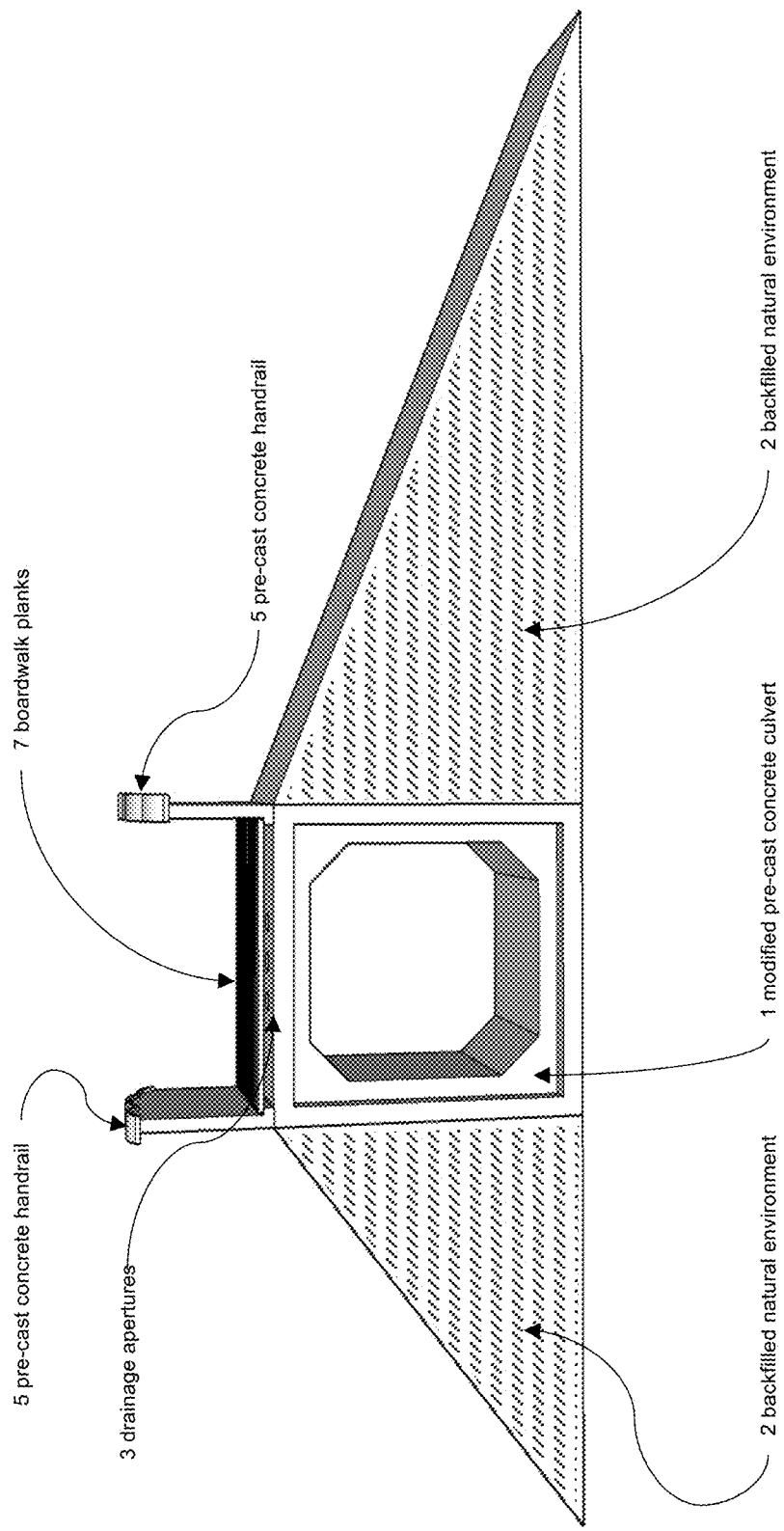
FIG. 1 illustrates exemplary cross section of the assembled components.

FIG. 1, illustrates a cross-section of the system in this embodiment of the invention whereby said pre-cast concrete handrails (5) are solid and sculptural to provide additional protection against flood waters overtopping the system and to redirect floodwater energy backout and away from the upland areas.

FIG. 1, illustrates how after installation of the embodiment of said flood prevention and mitigation system, a natural environment (2), appropriate to the location and embodiment of said system will be backfilled around the plurality of said modified pre-cast concrete culverts. Said natural environment (2) will be appropriately compacted, sculpted, landscaped and planted to provide additional flood prevention and mitigation protection in addition to disguising and hiding the plurality of modified pre-cast culverts to provide a visually pleasing and natural environment for flora and fauna.

All of said items are necessary for said system to function properly. No enhancements or additions are necessary to make said system function properly. Once properly installed, said system is ready to mitigate and defeat the next flooding event.

Once said system is installed into a coastal, riverine or wetland environment, when a flooding event occurs and water over-tops said backfilled natural environment (2) it either is attenuated and directed back into the floodwaters by said precast concrete handrail barriers (5) mounted atop said modified concrete culvert (1) or it flows onto said recycled plastic boardwalk planks (6) where it drains between said recycled plastic boardwalk planks (6) onto the top of said modified pre-cast concrete culvert (1). The precipitation and or flooding waters then flow through said drainage apertures (3) into said modified pre-cast concrete culvert (1) where it either flows to a designated floodwater collection point, a designated floodable area or is directed back into the floodwaters at some point where the floodwaters do not impact habitable areas infrastructure or structures. One-mile of said embodiment of the disclosed system can self-contain 7.5 million gallons of water or direct that flow to areas that are uninhabited or back into the flood waters themselves.

We claim:

1. A storm-surge, flooding prevention and mitigation system comprising:
   a modified concrete culvert comprising a pre-cast concrete culvert having a top face, a plurality of drainage apertures in the top face and a plurality of embedded galvanized steel bolts;
   a plurality of pre-cast concrete handrail barriers;
   a plurality of boardwalk planks to provide pedestrian and light vehicular access to surrounding ecosystem and upland areas;
   a plurality of galvanized steel bolts and nuts;
   a plurality of plugs to hide apertures in the plurality of boardwalk planks; and
   a coastal beach dune, riverine or wetland ecosystem to backfill and hide said modified concrete culvert;
   wherein a section of the plurality of pre-cast concrete handrail barriers is removably secured atop a section of the modified concrete culvert by a plurality of said galvanized steel bolts and nuts,
   wherein said plurality of boardwalk planks is removably secured to said section of the plurality of pre-cast concrete handrail barriers by a plurality of said galvanized steel bolts and nuts at regular intervals,
   wherein said coastal beach dune, riverine or wetland ecosystem is backfilled and planted against said modified concrete culvert to provide additional flood water attenuation and protection and to hide it from view, and
   wherein said section of the modified concrete culvert is joined together with a plurality of sections of said modified concrete culvert as necessary to protect a specified area.

2. A storm-surge, flooding prevention and mitigation system comprising:
   a modified concrete culvert comprising a pre-cast concrete culvert having a top face, a plurality of drainage apertures in the top face, and a plurality of embedded galvanized steel bolts;
   a plurality of pre-cast concrete handrail barriers;
   a plurality of boardwalk planks to provide pedestrian and light vehicular access to surrounding ecosystem and upland areas;
   a plurality of galvanized steel bolts and nuts;
   a plurality of plugs to hide apertures in the plurality of boardwalk planks; and
   a coastal beach dune, riverine or wetland ecosystem to backfill and hide said modified concrete culvert.

3. The storm-surge, flooding prevention and mitigation system as in claim 2, wherein a section of the plurality of pre-cast concrete handrail barriers is removably secured atop a section of the modified concrete culvert by a plurality of said galvanized steel bolts and nuts.

4. The storm-surge, flooding prevention and mitigation system as in claim 3, wherein said plurality of boardwalk planks is removably secured atop said section of the plurality of pre-cast concrete handrail barriers by a plurality of said galvanized steel bolts and nuts at regular intervals.

5. The storm-surge, flooding prevention and mitigation system as in claim 3, wherein said section of the modified concrete culvert is joined together with a plurality of sections of said modified concrete culvert as necessary to protect a specified area.

6. The storm-surge, flooding prevention and mitigation system as in claim 2, wherein said coastal beach dune, riverine or wetland ecosystem is backfilled and planted against said modified concrete culvert to provide additional flood water attenuation and protection and to hide the modified concrete culvert from view.

7. A system for storm-surge and flooding prevention and mitigation, the system comprising:
   a culvert having a top surface and opposing side surfaces;
   a boardwalk located on the top surface of the culvert;
   a handrail barrier located on the top surface of the culvert; and
   backfill located on the opposing side surfaces, the backfill configured to hide the culvert,
   wherein the handrail barrier is configured to attenuate and direct water back into floodwaters,
   wherein the boardwalk and the culvert are configured to allow water to drain into the culvert and be directed back into the floodwaters, into designated holding areas, into other floodable areas, or combinations thereof.

8. The system of claim 7, the culvert comprising a plurality of drainage apertures in the top surface, wherein the boardwalk is located above the plurality of drainage apertures, the plurality of drainage apertures configured to allow water to drain into the culvert.

9. The system of claim 7, the culvert comprising a plurality of bolts on the top surface, the plurality of bolts configured to receive the handrail barrier.

10. The system of claim 7, wherein the culvert and the handrail barrier are pre-cast concrete.

11. The system of claim 7, wherein the handrail barrier is configured to provide protection against flood waters overtopping the system and configured to redirect floodwater energy away from an upland area.

12. The system of claim 7, wherein the boardwalk comprises a plurality of recycled plastic boardwalk planks, the plurality of recycled plastic boardwalk planks configured to allow water to drain between adjacent planks of the plurality of recycled plastic boardwalk planks.

13. The system of claim 7, wherein the backfill is a natural environment from a location in which the system is installed.

14. The system of claim 7, further comprising a plurality of each of the culvert and the handrail barrier.

15. The system of claim 7, wherein the culvert, the handrail barrier, and the boardwalk form a subassembly of the system, and wherein multiple subassemblies are joined together as necessary to protect a specified area.

* * * * *